(12) United States Patent
Jager

(10) Patent No.: US 7,017,595 B2
(45) Date of Patent: Mar. 28, 2006

(54) UNIT FOR DETECTING AN ADDITION OF A CLEANING AGENT IN A BEVERAGE DISPENSER

(75) Inventor: Peter Jager, Geislingen/Steige (DE)

(73) Assignee: WMF Wuerttembergische Metallwarenfabrik AB, Geislingen/steige (DE)

( * ) Notice: Subject to any disclaimer, the term of this patent is extended or adjusted under 35 U.S.C. 154(b) by 260 days.

(21) Appl. No.: 10/461,279

(22) Filed: Jun. 13, 2003

(65) Prior Publication Data
US 2004/0011384 A1 Jan. 22, 2004

(30) Foreign Application Priority Data
Jul. 19, 2002 (EP) .................................. 02016131

(51) Int. Cl.
B08B 9/00 (2006.01)

(52) U.S. Cl. .................... 134/25.2; 134/22.1; 134/113; 134/166 R; 134/169 R; 99/290

(58) Field of Classification Search ............... 134/22.1, 134/25.2, 113, 166 R, 169 R, 169 C; 99/290
See application file for complete search history.

(56) References Cited

U.S. PATENT DOCUMENTS

| | | | |
|---|---|---|---|
| 3,338,153 A * | 8/1967 | Holstein et al. ........... 99/289 R |
| 4,848,381 A * | 7/1989 | Livingston et al. ....... 134/57 R |
| 4,956,887 A | 9/1990 | Hakulinen | |
| 5,297,596 A | 3/1994 | Anson | |
| 5,370,743 A | 12/1994 | Usui et al. | |
| 5,551,988 A * | 9/1996 | Reyhanloo et al. ......... 134/22.1 |
| 6,786,356 B1 * | 9/2004 | Geiger et al. ................. 221/96 |

* cited by examiner

Primary Examiner—Michael Barr
Assistant Examiner—Saeed T. Chaudhry
(74) Attorney, Agent, or Firm—Marshall, Gerstein & Borun LLP

(57) ABSTRACT

A unit for detecting an addition of a cleaning agent in a beverage dispenser, in particular in a coffee machine. In order to guarantee that a cleaning agent has been added when automatic cleaning is carried out, a measurement device is provided as well as a method of determining whether a cleaning agent has been added to the aqueous cleaning liquid. Whether a cleaning agent has been added to the aqueous cleaning liquid can be determined in dependence upon the measured conductivity and the measured electrical resistance of the cleaning liquid, respectively.

17 Claims, 3 Drawing Sheets

UNIT FOR DETECTING AN ADDITION OF A CLEANING AGENT IN A BEVERAGE DISPENSER

FIELD OF THE INVENTION

The present invention relates to a beverage dispenser, in particular a coffee machine, comprising a means for initiating and executing a cleaning process with an aqueous cleaning liquid.

BACKGROUND OF THE INVENTION

The most frequent failure cause in the case of beverage dispensers used on a commercial basis, such as a coffee machines used on a commercial basis, is insufficient cleaning. Al-though a regular execution of machine cleaning processes can be guaranteed by designing a suitable control software, it is impossible to guarantee that cleaning agents will actually be used during these cleaning processes. In fully automatic cleaning processes, liquid cleaning agents are used, among other substances. The cleaning agent is fed to the brewing unit at fixed times through a timer or in that a cleaning process is manually triggered by means of a pump. Such a means is complicated and expensive and, in addition, it is difficult to super-vise the flow of the cleaning agent.

SUMMARY OF THE INVENTION

It is therefore the object of the present invention to provide a beverage dispenser in which a correct addition of cleaning agents during the cleaning process can be checked.

According to the present invention, this object is achieved by a method and a measurement device for determining whether a cleaning agent has been added to the aqueous cleaning liquid.

Due to the fact that the aqueous cleaning liquid has provided therein a measurement device which is able to determine whether a cleaning agent has been added to the aqueous cleaning liquid, a correct cleaning process can be guaranteed. If it is detected that the aqueous cleaning liquid does not contain any cleaning agent, the cleaning process can be discontinued, if desired. An unintentional and unnoticed execution of an insufficient cleaning process without any cleaning agent can be prevented in this way.

According to a preferred embodiment, the measurement device is configured for determining the conductivity and the electrical resistance of the cleaning liquid. If cleaning agents of any kind are added to water, the conductivity of said water will increase markedly due to the addition of ionizable dissolved substances. The presence of cleaning agents in water can be measured in this way. Water containing no cleaning agent will have a resistance which is about ten times that of water containing a cleaning agent so that, in dependence upon the measured conductivity, it can reliably be differentiated whether or not a cleaning agent has been added to the aqueous cleaning liquid.

The measurement device preferably comprises two spaced-apart electrodes which are arranged in the cleaning liquid. This embodiment is inexpensive and easy to realize.

The means for initiating and executing a cleaning process comprises a control unit and a manual or an automatic feeder for the cleaning agent. According to a special embodiment, the beverage dispenser comprises a brewing unit, the measurement device being arranged downstream of the brewing unit in an advantageous manner. The device according to the present invention permits the measurement device to be arranged also downstream of the brewing unit, since even the presence of e.g. coffee powder will change the conductivity of the cleaning liquid only to a minor extent so that, in spite of the presence of coffee powder, it can be determined whether or not a cleaning agent has been added to the cleaning liquid.

According to an advantageous embodiment, the measurement device is fed by a constant current source for measuring then the voltage or the resistance between the electrodes. The measurement device can be integrated in an LCR measuring bridge or in a voltage divider. The electrodes may also have applied thereto an alternating voltage or a pulsed direct voltage so as to avoid oxidation and contamination.

According to a preferred embodiment, the measurement device is connected to the control unit and the control unit is configured in such a way that, if it is determined that no cleaning agent has been added, it will output a cleaning-process stop signal. This guarantees that no cleaning process without cleaning agent will be carried out. Furthermore, an additional indicator unit can be provided, which will then demand an addition of cleaning agents once more. The control unit may, however, also be configured in such a way that, when it has been determined that no cleaning agent has been added, the cleaning process will be continued, the control unit comprising an error memory for storing the absence of the cleaning agent.

Furthermore, the method according to the present invention comprises the step of determining at the beginning of the cleaning process whether a cleaning agent has been added to the cleaning liquid. The cleaning process can thus be stopped in time. According to an ad-vantageous embodiment, the output signal of the measurement is detected in analog form, e.g. as an analog voltage signal.

In the following, the present invention will be explained in detail making reference to the figures enclosed, in which:

DETAILED DESCRIPTION OF THE INVENTION

Figure 1:
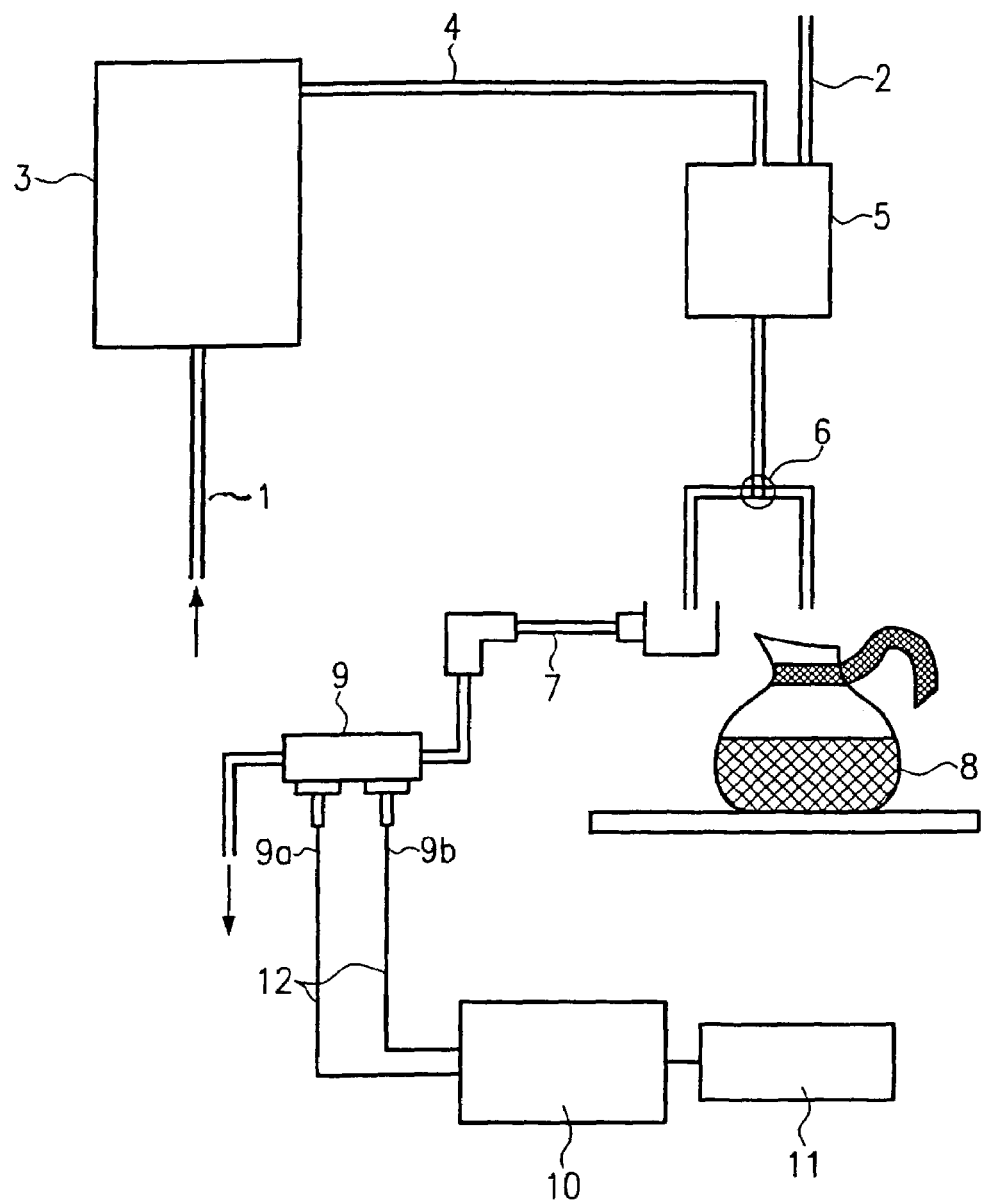
FIG. 1 shows a schematic, simplified representation of a beverage dispenser according to the present invention.
Figure 2:
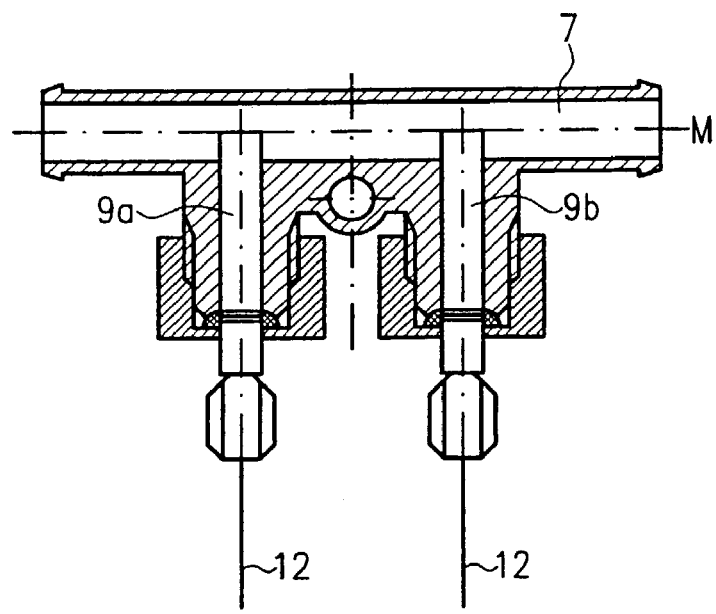
FIG. 2 shows a device for determining whether a cleaning agent has been added to an aqueous cleaning liquid.

FIG. 1 shows, in a greatly simplified representation, the schematic structural design of a coffee machine according to a preferred embodiment of the present invention. As can be seen in FIG. 1, the coffee machine according to the present invention comprises a water-supply line 1 through which water is conducted into a water heater 3 where it is heated. The hot water can run via a brewing line 4 into a brewing unit 5 to which coffee powder has been fed by a dosing means, which is not shown. The brewed coffee can then run via a 3/2-way valve 6 either into a coffee pot 8 or it can be discharged through a discharge line 7. Such coffee machines must be regularly cleaned with a cleaning agent. Cleaning is carried out either automatically or manually. In so doing, cleaning agent is fed to the brewing unit via a cleaning agent feeder 2. The cleaning process is initiated and executed by a control unit 10. In the present embodiment, the discharge line 7 has incorporated therein a measurement device 9 for measuring the conductivity and the electrical resistance of the cleaning liquid flowing off through the discharge line 7. As can be seen from FIG. 2, the measurement device 9 comprises two spaced-apart electrodes 9a, 9b which extend into the aqueous cleaning liquid. In the present embodiment, the two electrodes 9a, 9b extend up to the center line M of the tube section of the discharge line 7. The electrodes may consist e.g. of titanium or of V2A steel. The electrode spacing ranges preferably from 5 to 30 mm, in the preferred embodiment it is e.g. 16 mm. The size of the electrode surface ranges between 10 and 50 mm2, in the present embodiment it is e.g. 35 mm2. The media temperature is between 90 and 100°.

Via the lines 12, a current is applied to the electrodes 9a and 9b via a constant-current source or an a.c. voltage source (e.g. 100 Hz or in the KHz range), which is not shown. The control unit 10 is connected to the measurement device 9 and interprets the measurement value detected by said measurement device 9 so as to find out whether or not cleaning agent is contained. The control unit 10 is additionally connected to an indicator unit 11 capable of outputting an optical and/or an acoustic signal.

At the beginning of the cleaning process, i.e. when the cleaning process has been initiated by the control unit 10, a measurement is carried out by the measurement device 9. If cleaning agents of any kind are added to water, the conductivity of water increases markedly due to the addition of ionizable dissolved substances. The presence of cleaning agents in the aqueous cleaning liquid can be measured in this way with the aid of the two electrodes 9a, 9b, i.e. the ohmic resistance R of the measurement arrangement changes in accordance with the addition of cleaning agents, since $R = \rho \times l/A$ (wherein $\rho$ is the specific resistance of the solution, l the electrode spacing and A the effective electrode surface). The quotient l/A is the resistance capacitance for the measurement arrangement, which is a constant value. It follows that the conductivity of the cleaning liquid can be ascertained through the measurement of the ohmic resistance and through the measurement of the voltage between the electrodes 9a and 9b, respectively.

The output signal of the measurement device is detected in analog form by the control unit 10. The analog output signal can also be converted into a digital signal via a threshold switch. The output signal of the measurement device is detected via the normal wiring for resistance measurement; the measurement device can be integrated either in an LCR measuring bridge or in a voltage component.

Figure 4:
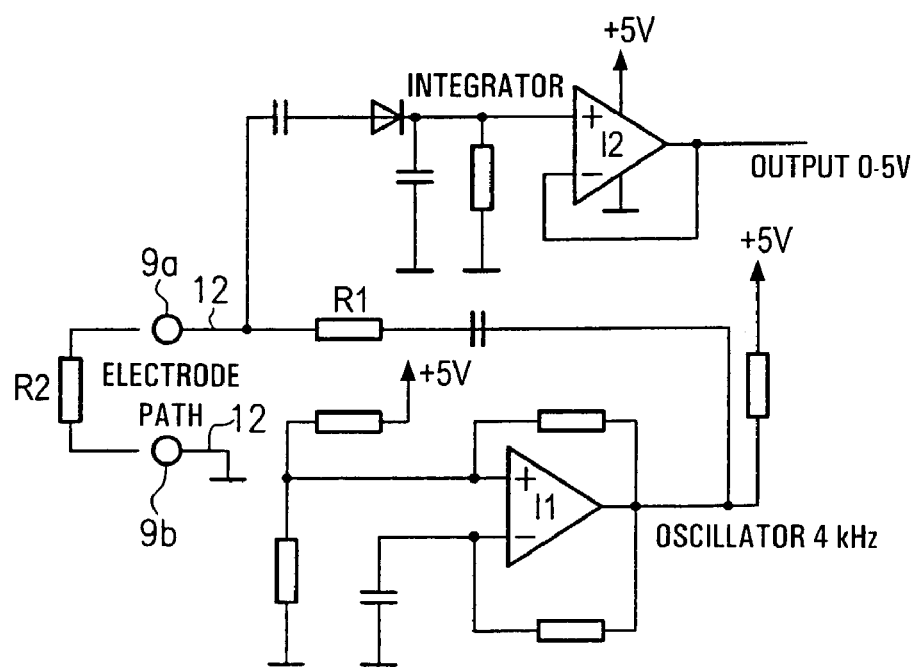
FIG. 4 shows an equivalent circuit diagram for voltage measurement.

FIG. 4 shows an example for an equivalent circuit diagram for voltage measurement. As has already been mentioned, the electrodes 9a and 9b are supplied with alternating voltage via lines 12 through the oscillator (I 1). In order to prevent deposits on the electrodes, an alternating voltage in the KHz range, here 4 KHz, is applied to the electrodes in this embodiment. It is also imaginable to apply a pulsed direct voltage to the electrodes. An alternating voltage will also prevent an oxidation of the electrodes. In FIG. 4, the resistor R2 corresponds to the ohmic resistance in the measurement solution which is to be determined. The resistors R1 and R2 define a voltage divider. The signal from the voltage divider, whose magnitude depends, in turn, on the conductivity of the measurement solution, is then ap-plied to a voltage follower. The voltage-divided signal is here integrated in the integrator (I 2). The analog output signal can be converted into a digital signal via a threshold switch, or it can be evaluated directly via the analog input of the control unit 10. According to the present invention, the measurement device, for example, comprises electrodes 9a, 9b with an electrode spacing of 16 mm and a respective electrode surface of 35 mm2. In the case of a measured conductivity of various drinking waters in the range of 500 to 1000 μS, the following holds true:

$$R = L/(A * \rho) = 16 \text{ mm}/(35 \text{ mm}^2 * 500 \text{ μS}) = 914 \text{ Ω}$$

$$16 \text{ mm}/(35 \text{ mm}^2 * 1000 \text{ μS}) = 457 \text{ Ω}$$

With the electrode dimensions chosen, a resistor of R1=180 ohm is recommended. In the case of a voltage divider of 180 ohm to 914 ohm and 457 ohm, respectively, this will, in the case of drinking water, result in an output voltage or measurement voltage of 4.2 volts to 3.6 volts when a voltage of 5 volts is applied.

The control unit 10 interprets the measurement value so as to find out whether or not cleaning agent is contained, i.e. the measurement value is compared e.g. with reference values stored in the control unit 10, whereupon it is decided whether the measurement value corresponds to a conductivity with or without cleaning agent. If the measurement value corresponds to a conductivity with cleaning agent, the cleaning will be continued. If the measurement value corresponds to an electric conductivity for a cleaning liquid without a cleaning agent, which means that a cleaning process has been initiated but no cleaning agent has been supplied to the tap water via the cleaning agent feeder 2, the cleaning process will be discontinued by the control unit 10 in that the control unit outputs a cleaning-process stop signal. Simultaneously, the control unit can pass on a signal to the indicator unit 11 which will demand an addition of cleaning agents once more. The indicator unit 11 can out-put an optical an/or an acoustic signal. It is, however, also possible that the control unit 10 is configured in such a way that, even if it is detected that no cleaning agent has been added to the cleaning liquid, the cleaning process will be continued nevertheless. The absence of the cleaning agent is, however, stored in an error memory, which is not shown, and, if desired, an error message can appear.

Figure 3:
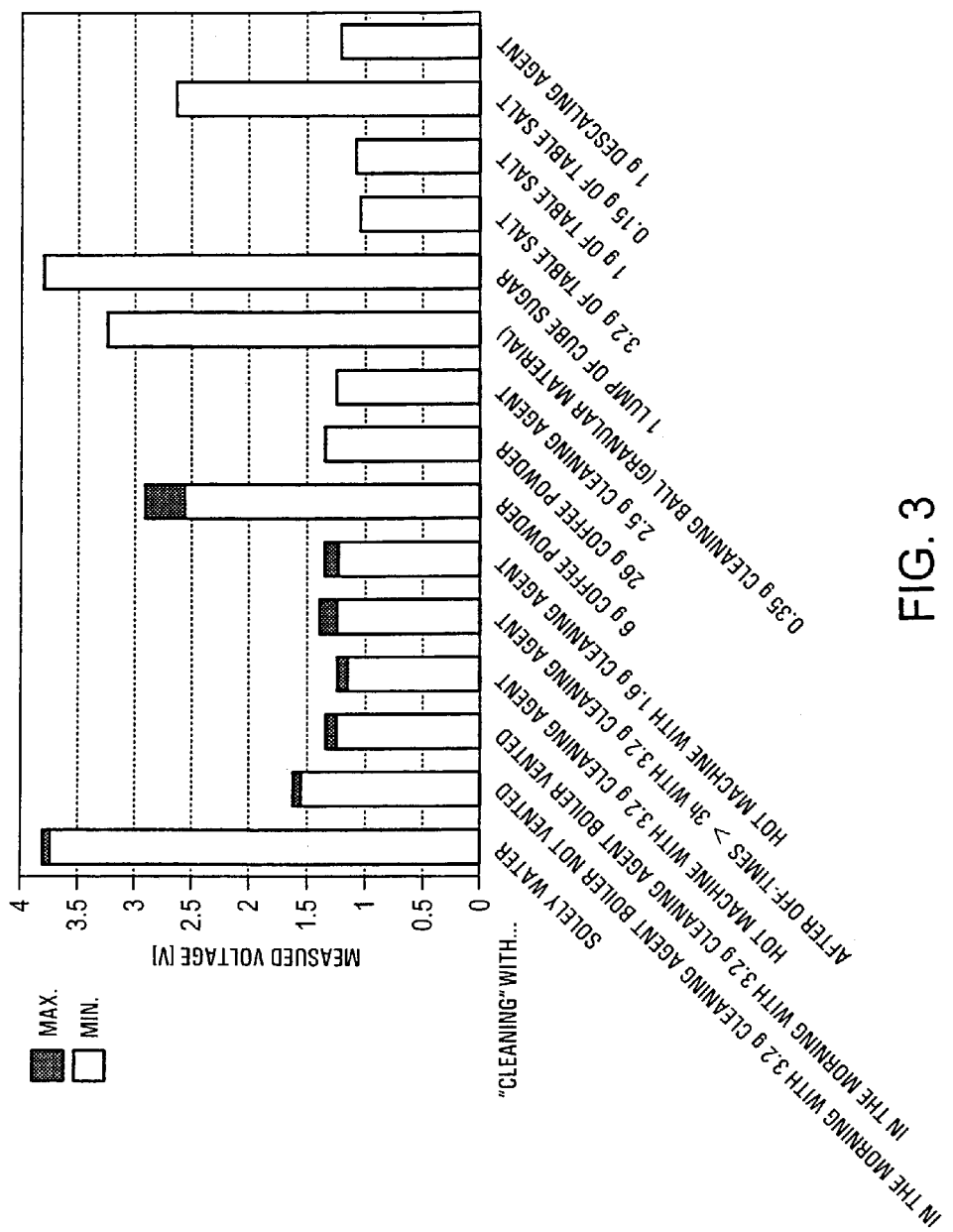
FIG. 3 shows measurement results of various media measured by the device according to the present invention.

FIG. 3 shows the voltages between the electrodes 9a and 9b of various media, which have been measured by the arrangement shown in FIG. 1. As can be seen from FIG. 3, the measured voltages will drop markedly, when a cleaning agent is added to the cleaning liquid. A possible presence of coffee powder in the brewing unit 5 will not corrupt the measurement result, since the respective voltage measured is markedly higher than the voltages measured in the presence of cleaning agents. Only a very large amount of coffee corresponding to 26 g of coffee powder will reduce the measured voltage to such an extent that it corresponds to a range which is equal to the conductivity range of cleaning liquid with cleaning agent. This will, however, not interfere with the measurement, since 26 g of coffee powder exceed the normal amount of coffee powder by far. Such large amounts will not be used in practice and, if this should actually be the case, the control unit would indicate a malfunction of the motor of the brewing unit so that the cleaning process could not even be started.

Summarizing, it should therefore be stated that the beverage dispenser according to the present invention as well as the method according to the present invention permit reliable cleaning.

What is claimed is:

1. A beverage dispenser, comprising: a means (10, 2) for initiating and executing a cleaning process with an aqueous cleaning liquid, and a measurement device (9) for determining whether a cleaning agent has been added to the aqueous cleaning liquid during the cleaning process, wherein the measurement device (9) is configured for determining at least one of the conductivity and the electrical resistance of the cleaning liquid, the beverage dispenser comprises a brewing unit (5); and the measurement device (9) is arranged downstream of the brewing unit (5).

2. A beverage dispenser according to claim 1, wherein the measurement device (9) comprises two spaced-apart electrodes (9a, 9b) which are arranged in the cleaning liquid.

3. A beverage dispenser according to claim 2, wherein an a.c. voltage source applies an alternating voltage to the electrodes (9a, 9b).

4. A beverage dispenser according to claim 2, wherein the electrodes (9a, 9b) have applied thereto a pulsed direct voltage.

5. A beverage dispenser according to claim 1, wherein the means (10, 2) for initiating and executing a cleaning process comprises a control unit (10).

6. A beverage dispenser according to claim 5, wherein the measurement device (9) is connected to the control unit (10), and the control unit (10) is configured such that, if it is determined that no cleaning agent has been added, it will output a cleaning-process stop signal.

7. A beverage dispenser according to claim 6, wherein the control unit (10) is additionally connected to an indicator unit (11) which demands an addition of cleaning agents once more.

8. A beverage dispenser according to claim 5, wherein the control unit (10) comprises an error memory for storing the absence of the cleaning agent.

9. A beverage dispenser according to claim 1, wherein the means for initiating and executing a cleaning process comprises one of a manual and an automatic feeder for the cleaning agent.

10. A beverage dispenser according to claim 1, wherein the measurement device (9) is fed by a constant current source.

11. A beverage dispenser according to claim 1, wherein the measurement device (9) is integrated in one of an inductance, capacitance, and resistance measuring bridge and in a voltage divider.

12. A method of cleaning a beverage dispenser with an aqueous cleaning liquid, comprising:

determining, by means of a measurement device, whether a cleaning agent has been added to the aqueous cleaning liquid;

wherein the step of determining whether a cleaning agent has been added to the aqueous cleaning liquid is carried out in dependence upon at least one of the measured conductivity and the measured electrical resistance of the aqueous cleaning liquid; and the measurement device (9) is arranged downstream of a brewing unit (5).

13. A method according to claim 12, wherein the measurement is executed via two electrodes which have one of a direct voltage, a pulsed direct voltage, and an a.c. volt-age applied thereto.

14. A method according to claim 12, wherein the output signal of the measurement is detected in analog form.

15. A method according to claim 12, wherein the step of determining whether a cleaning agent has been added to the cleaning liquid is carried out at the beginning of the cleaning process.

16. A method according to claim 12, and wherein, when it has been determined that no cleaning agent has been added, the cleaning process is discontinued and an addition of cleaning agent is demanded once more.

17. A method according to claim 12, and wherein, when it has been determined that no cleaning agent has been added, the cleaning process is continued, with the absence of the cleaning agent being, however, stored in an error memory.

\* \* \* \* \*

UNITED STATES PATENT AND TRADEMARK OFFICE
CERTIFICATE OF CORRECTION

PATENT NO. : 7,017,595 B2 Page 1 of 1
APPLICATION NO. : 10/461279
DATED : March 28, 2006
INVENTOR(S) : Peter Jager It is certified that error appears in the above-identified patent and that said Letters Patent is hereby corrected as shown below:

On the Title Page:

At line Item (73), "Geislingen/steige" should be -- Geislingen/Steige --.

At line Item (30), "02016131" should be -- 02016131.1 --.

In the Claims:

At Column 6, line 21, "volt-age" should be -- voltage --.

Signed and Sealed this

Sixteenth Day of January, 2007

JON W. DUDAS
*Director of the United States Patent and Trademark Office*